Oct. 31, 1933.    C. T. RAULE    1,933,028
GRINDER
Filed Aug. 2, 1926    8 Sheets-Sheet 1

INVENTOR.
Clifford T. Raule
BY
ATTORNEY.

Witness:

Oct. 31, 1933.    C. T. RAULE    1,933,028
GRINDER
Filed Aug. 2, 1926    8 Sheets-Sheet 2

Fig 2

INVENTOR.
Clifford T. Raule
BY
ATTORNEY.

Witness:

Oct. 31, 1933.  C. T. RAULE  1,933,028
GRINDER
Filed Aug. 2, 1926     8 Sheets-Sheet 5

Fig 9

INVENTOR.
Clifford T. Raule
BY
ATTORNEY.

Witness:
Frank H. Hohman, Jr.

Oct. 31, 1933.  C. T. RAULE  1,933,028
GRINDER
Filed Aug. 2, 1926    8 Sheets-Sheet 6

INVENTOR.
Clifford T. Raule
BY
ATTORNEY.

Oct. 31, 1933.      C. T. RAULE      1,933,028
GRINDER
Filed Aug. 2, 1926      8 Sheets-Sheet 7

INVENTOR.
Clifford T. Raule
BY
ATTORNEY

Oct. 31, 1933.                C. T. RAULE                1,933,028
                               GRINDER
                         Filed Aug. 2, 1926            8 Sheets-Sheet 8

INVENTOR.
Clifford T. Raule.
BY
W. Steell Jackson
ATTORNEY.

Witness:
Frank H. Johnson, Jr.

Patented Oct. 31, 1933

1,933,028

UNITED STATES PATENT OFFICE 1,933,028

GRINDER

Clifford T. Raule, Brookline, Pa.

Application August 2, 1926. Serial No. 126,403

39 Claims. (Cl. 51—50)

My invention relates to grinding machines, chiefly internal.

A purpose of my invention is to obtain quantity production of precision internally ground duplicate parts, whether internally straight, taper or curved.

A further purpose is to control the feed of a plurality of bodily movable grinding units by means common to all.

A further purpose is to guide the grinding units of a multiple spindle internal grinder through a cycle of operations, the same for all, by mechanism common to all, preferably by engagement with a stationary supporting structure, thus synchronizing the operations with respect to angular position around the supporting structure.

A further purpose is to move and operate a succession of internal grinding units around the same orbit, to successively withdraw the wheels from the respective work pieces as they reach a definite position of the orbit, preparatory to delivering the work and to complete the operation before completing the circuit of the orbit.

A further purpose is to automatically step back the wheel of an internal grinder from its work preparatory to its entry or departure from the work.

A further purpose is to load and discharge a multi-spindle internal grinder automatically.

A further purpose is to adapt a multiple grinder to either centered or centerless grinding.

A further purpose is to mount end grinding mechanism to operate in the orbit of a multiple spindle internal grinder.

A further purpose is to compensate automatically for the wear of a wheel and to automatically signal when the wheel wears down to any predetermined size. This is believed to be new in grinding.

A further purpose is to perform at successive positions around a stationary supporting structure upon successive grinding units revolving continuously or intermittently around an orbit within the structure the operations of charging in centered or centerless chucks automatically or by hand, of inserting the wheel into the work out of contact therewith, of stepping the traversing wheel and the work into grinding contact, of progressively feeding the wheel to the work or the work to the wheel preferably with a positive feed, of withdrawing the wheel from the work and of automatically discharging the work.

A further purpose is to provide common control upon multiple units of the successive operations of internally grinding work which is suited to either hand or automatic feed and hand or automatic discharge. In such a structure I step the work and wheel into grinding contact after insertion of the wheel and separate them before removal of the wheel, reduce the feed for finish grinding, diamond the wheel and face the work. All of the steps permissible with individual grinders can be performed upon the multiple units selectively, omitting those not desired and substituting alternative steps as required and the steps as well as their sequence may be carried out automatically.

A further purpose is to take out chatter marks or other deleterious effects of vibration by speeding up the work or otherwise changing the position of vibration nodes with respect to the engaging surface of the work.

A further purpose is to reduce the relative speed between the engaging surface of a grinding wheel and its work during the finishing operation by automatically reducing the speed of the wheel or by automatically changing the speed of the work, either or both, but preferably by reducing the speed of the wheel.

A further purpose in a multiple spindle machine is optionally to mount a plurality of wheels on the same spindle and automatically to vary the wheel used according to the stage of the work.

Further purposes in multiple spindle machines are to provide interchangeable grinding units and interchangeable chucks adapted for quick insertion or removal.

A further purpose in a multiple spindle machine is to grind taper work by setting the revolving work at an angle, setting the wheel head at an angle or by tapering the wheel, and to grind radially while oscillating the work pivotally on an axis at the radius distance from the surface of finished grinding.

Further purposes include applying stationary arcuate cams to the successive grinding units of a multiple spindle internal grinder respectively to progressively feed the grinding wheel into the work, to operate the work holder, to move the wheel to and from the work interior, to operate the traverse and the diamonding traverse and to control the relative speed of the wheel and work.

My invention relates to the process involved and also to apparatus by which the processes are carried out.

Further purposes will appear in the specification and in the claims.

I have elected to show a few only of many different forms of my invention, selecting forms that are at once easy and inexpensive to manufacture and efficient in operation and which well illustrate the principles involved. For the sake of greater clearness the drawings are made to a considerable extent diagrammatic.

My invention contemplates mounting a plurality of grinding units upon a turn-table at spaced intervals, the units traveling the same endless path and operating simultaneously at different phases of the same cycle of operations. The cycle is carried out in connection with stationary supporting structure of the table and the phase of the grinding operation at any unit at a given instant of its travel depends upon its angular position at that instant with respect to the stationary supporting structure.

The work ground may be of any type to which an individual automatic internal grinder is suited. Ball races well illustrate one type.

I feed successive duplicate work pieces at a (loading) point or points of the stationary structure to the successive units as they pass this point and eject them successively at another (discharging) point a little before again reaching the first point. Each unit when it has completed its revolution to the first point has discharged its work and is ready for a new cycle.

Each grinding unit comprises a rapidly revolving grinding wheel and a work-holder adapted to revolve a work piece with means for relatively traversing the wheel and work-holder, preferably by traversing the wheel.

The cycle of operations is exactly the same for all of the units. A work piece enters the machine and is secured in or upon the revolving workholder. The wheel then enters the interior of the work, preferably out of contact with the work until it is within the work interior. Traverse grinding follows with progressive feed of the wheel to the work, or the work to the wheel, until the piece is ground to nearly its finish size. Preferably before finish grinding the wheel is taken out of the work and trued by diamonding, being given a small feed to the truing diamond. To eliminate any chattering the speed of the work is changed (most desirably increased) just before finish grinding in order to eliminate the cyclic unevennesses of surface due to lack of absolute dynamic balance of the rotating parts. Where the character of work or design or use otherwise eliminates or discounts chatter this step may be left out in the design of the machine or may be omitted selectively by the operator by substitution of different guides. After finish grinding the speed of the wheel is preferably reduced for giving a finish polish. Should it be desirable to face grind one end of the work piece this may be done conveniently while the wheel is out of the work interior.

As the grinding unit approaches its position for discharge the wheel is automatically removed from the work interior to permit the removal of the work. Preferably the wheel is stepped away from the work before taking it out of the work interior as well as before inserting it into the work interior so that there is no engagement between the wheel and work except while the wheel is well inside the work interior.

The invention is subject to very wide variation in its application to different kinds of work and I have shown figures that are to a considerable extent diagrammatic in order to more clearly illustrate the principles involved.

Figure 1:
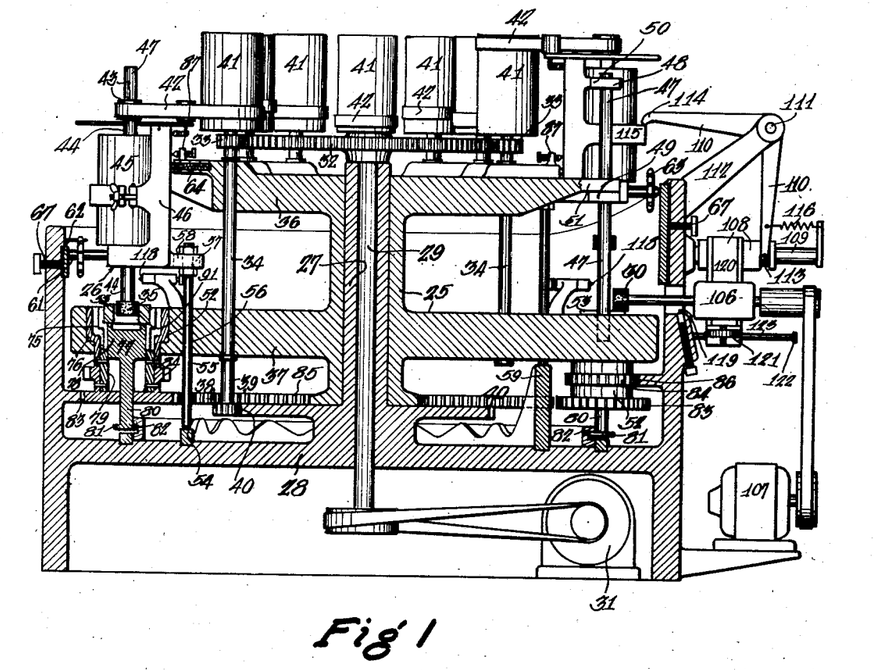
Figure 1 is a vertical section illustrating one form of my invention being a section upon line 1—1 of Figure 2.
Figure 2:
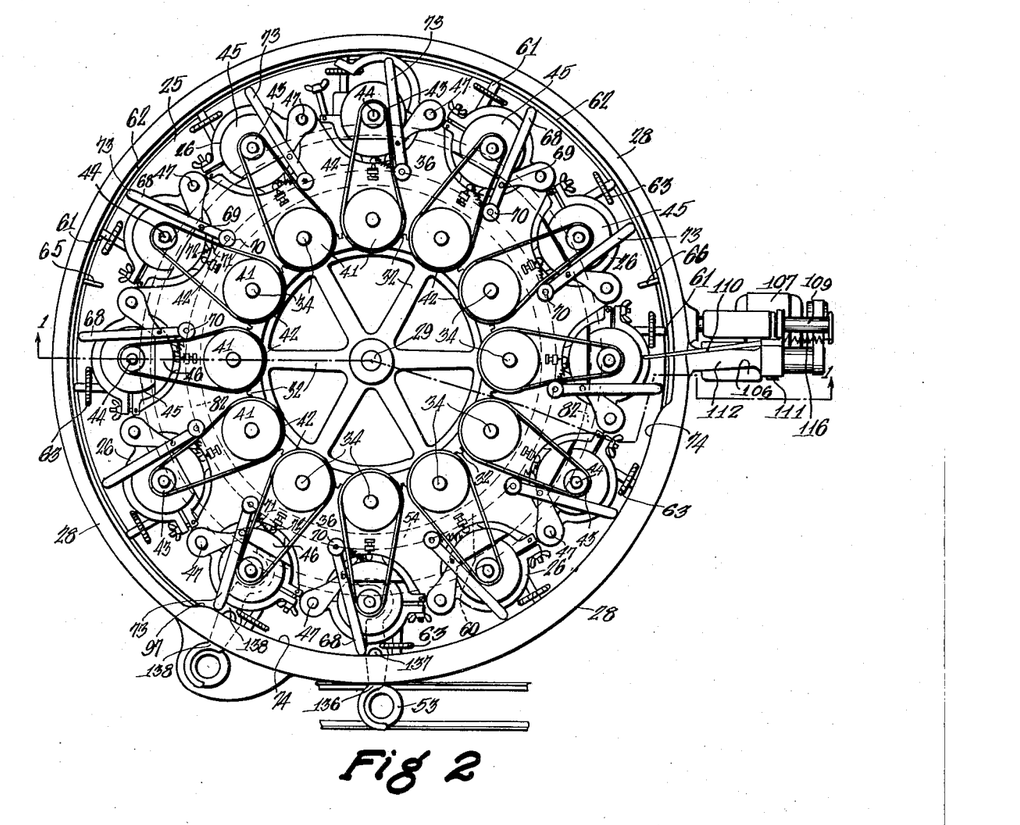
Figure 2 is a top plan view of Figure 1.

In Figures 1 and 2 the turn-table 25 carrying the grinding units 26 is revolubly mounted upon a vertical tubular shaft 27 that is rigidly fastened to the stationary supporting structure 28 and a main driving shaft 29 is connected to effect all of the different motions of the cycle except the drive of the facing wheel 30.

The main driving shaft is shown as belt-driven by a motor 31 and carries a large gear 32 at its upper end which meshes with pinions 33 upon the drive shafts 34 of the individual wheels 35. The shafts 34, one for each wheel, are journaled in upper and lower portions 36 and 37 of the turn-table 25.

The turn-table is driven by a pinion 38 upon a downwardly extending portion 39 of one of the shafts 34. This pinion meshes in the teeth of a stationary gear 40 that forms part of the structure 28.

Each of the shafts 34 carries at its upper end a long pulley 41 which drives the wheel 35 by belt 42 and pulley 43 upon the wheel spindle 44.

The wheel spindle is revolubly mounted within a suitable bearing 45, that is removably clamped in a carrier 46, the bearing, spindle and wheel forming a wheel unit.

The wheel units are all alike and are interchangeably mounted in the respective carrier members 46. Each carrier member is pivotally supported on and vertically slidable upon a hinge pin 47. This pin (as best seen to the right in Figure 1) is supported at 48 and 49 in the upper and lower portions of the turn-table, upper and lower arms 50 and 51 of the turn-table being bored to slidingly fit the pin.

The axes of the hinge pins and of the work holders 52 are preferably at substantially the same radial distance from the axis of the turntable and each wheel carrier 46 is adapted to axial reciprocation for wheel traverse and permits its wheel to swing into and out of grinding engagement with the interior surface of the work 53.

The vertical or axial movement of the carrier 46 to effect wheel traverse is conveniently accomplished by a cooperating engagement between an upwardly directed circumferential face cam 54 and a downwardly extending member 55 from the carrier.

While in practice this member 55 may comprise a downwardly extending portion of the hinge 47, then rigidly fastened to the carrier and having a sliding journal fit through the upper and lower portions of the turn-table, I have for greater clearness of illustration shown it offset from the hinge pin.

As illustrated in Figures 1 and 2 traverse member 55 has a sliding fit at 56 through the lower portion of the turn-table. Its lower end rests upon the stationary face cam 54 and its upper end has a horizontally slidable connection at 57 with an arm 58 extending from the carrier.

The connection at 57 is horizontally slidable to permit the carrier to swing on its pivot 47, the arm 58 being slotted vertically to permit the desired angular movement of the carriage 46 on its pivot 47. This slot is indicated in Figure 1 by vertical dotted lines 57 on each side of the pin 55.

As the turn-table rotates the carrier rises and falls to cause the wheel to traverse the work and high portions of the face cam are provided at desired positions to lift the wheel all the way out of the work, as at 59 for truing the wheel and face grinding the work before finish grinding and at 60 after finish grinding preparatory to discharging the work.

The outer end of an outwardly extending rod 61 secured to the carrier 46 engages the inner surface of a stationary feed cam 62.

The cam 62 extends around the machine, presenting an inner surface to the end of the rod 61 that throughout the major portion of its length progressively approaches nearer the axis of the turntable to progressively feed the wheel into the work.

The feed rod 61 is shown as adjustably screwing into the carrier and, near its outer end as carrying rigidly fastened to it a star wheel 63 for use in screwing the rod in or out to adjust its effective length.

The carrier 46 is spring pressed outwardly at 64 to maintain it resiliently pressing against the feed cam.

Projecting pins are provided in the path of the star wheels at any desired position or positions around the interior of the frame structure (as at 65 and 66 of Figures 1 and 2) to change the effective length of the feed rod by the small automatic screw feed provided by the star wheel.

Such a star wheel feed may be used to take up for any wear of the wheel or to correct or change the feed of the cam.

Figure 21:
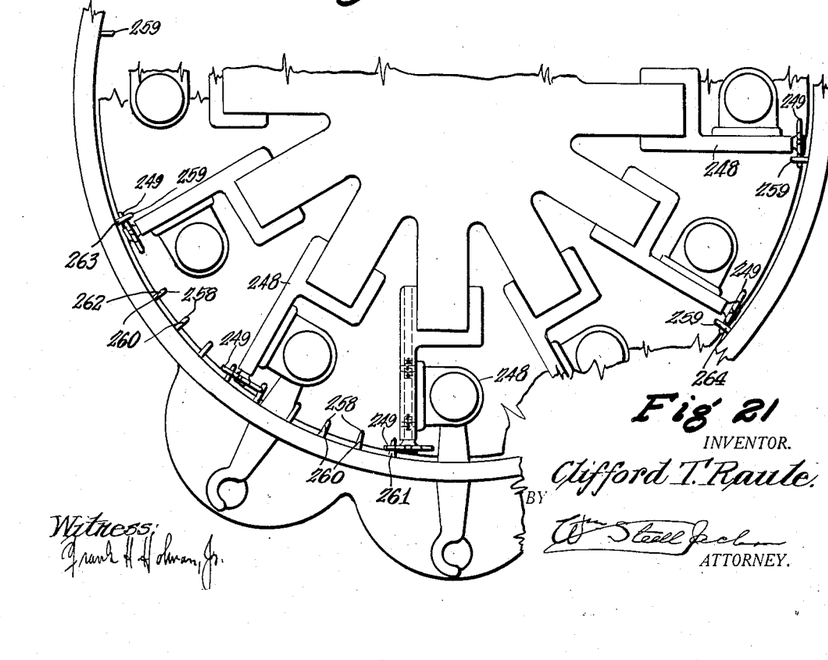

When the feed cam is correctly adjusted there will usually be need for only one automatic star wheel feed, that will preferably take place just before diamonding. If desired, the feed may be altogether by star wheel instead of by cam as illustrated in Figure 21.

The feed cam is desirably supported adjustably, as by means of screws 67 swiveled into the cam.

A lever 68 is pivotally mounted at 69 upon the top of each carrier 46 and carries an idler pulley 70 to engage the belt 42 driving the wheel spindle. This pulley is maintained to its belt tightening duty by means of a spring 71 stretched between the outer end of the lever and any convenient anchor 72 on the carrier. The lever has an outwardly extending arm 73, the outer end of which engages a cam 74 just before position of finish grinding is reached. The engagement between the cam 74 and the end of the arm 73 deflects the lever to loosen the tightness of the belt with the result that the speed of the wheel is lessened after finish grinding has been substantially completed which I find very desirable for polishing purposes.

The work holder 52 has a journal seat in the work table and may be of any suitable type. In the structure illustrated in Figures 1 and 2 a slotted spring jaw portion 75, that may be integral with an outer bearing portion 76 spreads somewhat when an interior ejector or chuck operating member 77 is in its high position and is tight when this member is in low position.

The operating member 77 is adapted to movement up and down, within the chuck, having a head 78 that in low position fits the lower portion of the bore 79 and in high position engages the interior surface of the split jaws wedging the jaws open. A central stem 80 extends downwardly from the member 77 and terminates in a flange 81 that is adapted to fit and slide along a circumferential stationary groove cam 82. This groove cam in cooperation with the stem 80 automatically operates the chuck as the turn-table rotates.

The body of the chuck extends downwardly below the turn-table and its lower end carries rigidly fastened to it gears 83 and 84 operative for rotating the chuck at different speeds at different portions of the cycle.

The larger gear 83 throughout most of the cycle meshes with stationary teeth 85 around the inside of the stationary frame structure, and rotates the chuck in rolling along these gear teeth as the table rotates.

I find it desirable to speed up the chuck before finish grinding in order to eliminate cyclic unevennesses upon the ground surfaces of the work pieces. These unevennesses may be visible as chatter marks but more usually are too small to be detected by the eye or by touch.

Speeding up the work is more effective to smooth out the unevennesses, than slowing it down though any change in the work speed may operate to make the ground surface more even, the result being due to the mere change of synchronism between the work and wheel evidenced by the high and low phases of vibrations between the work and wheel. This change in work speed, which is preferably an increase in speed, may be made in any suitable way.

As illustrated in Figure 1 when the turn-table reaches position for finish grinding the stationary frame presents gear teeth 86 to the smaller gear 84, no longer presenting teeth to the larger gear 83, the result being that the work is speeded up correspondingly to the reduction in the gear ratios.

Provision is made upon each wheel unit for automatically signaling when the wheel wears away to a size such that it needs replacement. A screw contact member 87 is mounted upon the upper portion of the turntable a small distance radially inward from each wheel carrier. Electrical connections shown in diagram close a signaling circuit when the carrier engages the insulated point 87 which signals the operator that the wheel is worn away to an extent that makes it advisable to replace the wheel unit. Desirably the telltale connections will not merely signal the operator but will also automatically prevent the wheel from entering a new piece of work after its last cycle of operation, as by latching the carriage in raised position through the operation of a suitable electromagnet when the telltale contact closes.

Figure 3:
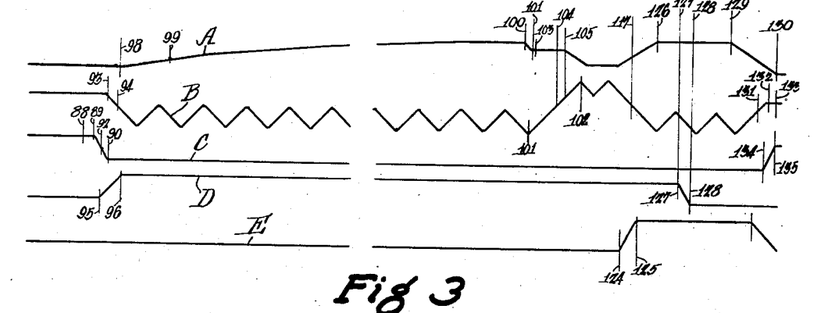
Figure 3 is a diagrammatic view illustrating the cycle of operations.

The cycle of operations is illustrated in Figure 3, curves A, B, C, D and E. In these curves, A represents the rate of feed of the wheel to the work, B the vertical position of the wheel unit, C the condition of the chuck with respect to tightness and looseness, D the condition of the wheel with respect to speed, and E the condition of the chuck with respect to speed.

Referring to this figure and following a work piece through its cycle, the work piece enters the machine at 88 (curve C) where it is received upon the raised upper end of the chuck operating member 77, which is holding open the chuck and may extend to the upper surface of the chuck. As the table rotates the member 77 moves down between the lines 89 and 90 the work following until it seats upon the shoulder 91 within the chuck. This seating takes place at the line 92 and the chuck tightens upon the work between the lines 92 and 90. The wheel 35, now in raised position above the work and located radially inwardly from the interior surface of the work, begins to move downwardly at 93 (curve B) which may be at or somewhat before the tightening operation of the chuck is complete. The wheel is set sufficiently inward from the interior surface of the work to avoid engagement with the surface when it enters the work interior. It has reached the upper limit of its traverse at the line 94 being then within the interior of the work but not engaging the work. The wheel is shown speeding up between the lines 95 and 96 (curve D) by reason of the tightening of the belt 42 when the arm 73 leaves the cam 74 at 97, Figure 2. After the polishing operation of the last preceding work piece the wheel may speed up from polishing speed to cutting speed at any time before grinding starts upon the new piece, that is, upon the piece now under consideration.

Feeding of the wheel toward the work begins at the line 98 (curve A) which is preferably coincident with the line 94 when the wheel is first within its range of traverse.

At the line 94 the wheel is offset from the work surface a small and unknown amount that will be variant with successive work pieces according to variation in interior diameter of these pieces, and the wheel first engages the work at some line 99 (curve A) the position of which will be variant with successive pieces when the interior diameters of the pieces vary.

Between the lines 99 and 100 there is traverse grinding at a rate dependent upon the slope of the feed cam 62. The rate of feed is made more rapid during the earlier part of the grinding and is made progressively smaller when the piece is nearly ground to size. The piece is substantially to size at the line 100 and the wheel is stepped away from the work between the lines 100 and 101, removing the wheel from the interior of the work for diamonding.

The wheel unit is rising between the lines 101 and 102 (curve B) having been given a star feed at 103 and passed across the truing diamond between the lines 104 and 105.

The star feed is preferably given before diamonding in order to have a freshly trued wheel for finish polishing. Permissibly star feeding may be performed at any part of the cycle and the extent of this feed for truing should be somewhat greater than the wear of the wheel during one cycle. The wheel carrier in its upward travel moves an auxiliary wheel 30 across the top of the work for facing the work with a single chucking.

The facing wheel 30 is part of a wheel unit 106 (Figures 1 and 2) that is belt driven by a motor 107 and is vertically adjustably supported upon a horizontally slidable carriage 108. The carriage 108 is positioned along its supporting guide 109 by means of a bell crank lever 110 pivoted at 111 upon a projecting arm 112 of the supporting structure.

One end of the bell crank lever 110 (Figures 1 and 2) has pin and groove connection at 113 with the carriage 108 while the other end 114 is engaged and raised by a portion 115 of each of successive wheel carriers 46 to move the carriage into operating position for facing the work. The bell crank lever is spring retracted at 116 so that the facing wheel moves back when the carrier 46 moves down.

Returning to the cycle as represented by the curves of Figure 3, the wheel carrier 46 is vertically reciprocated between the lines 105 and 117 to effect a horizontal traverse of the facing wheel 30 which has been moved to operating position for facing the work by the rising of the carrier 46. The depressed portion of the feed curve between the lines 105 and 117 indicates that the feed cam 62 has been formed to slightly offset the wheel carrier 46 to avoid engagement between the wheel 35 and its diamond 118 during the vertical reciprocation of the carrier for horizontally traversing the wheel 30.

The facing wheel ultimately leaves the work at about the line 117 and preferably this takes place when the position of the turntable is such that the withdrawal of the facing wheel is radial to the work.

A diamond 119 is shown for truing the facing wheel as it moves outwardly. The facing wheel unit 106 is shown vertically adjustable along the guide-way 120 which is a portion of the carriage 108. Screw adjustment is indicated at a hand-adjustable star wheel 121 for exactly determining the proper height of the facing operation, and an automatic feed to the diamond may be affected by periodic engagement between the rim of a button 122 upon the outer end of a stationary rod 123 and the successive teeth of the star wheel 121.

If desired the traverse and withdrawal movements of the facing wheel may be made by separate mechanism. The facing finish is better if the wheel leaves the work radially which makes it desirable to withdraw the facing wheel successively as the work pieces successively reach the position for radial withdrawal. Removal for diamonding may be automatic or non-automatic.

After facing which is completed at the line 117 the carrier 46 moves down bringing the wheel 35 again into the interior of the work piece 53, being offset from the surface of the work piece until it has entered the interior of the work.

The speed of the work has meanwhile been increased between the lines 124 and 125, the work being now driven by the smaller gear 84 instead of the larger gear 83, stationary teeth 86 meshing with the smaller gear and none being provided to engage the larger gear. At the line 126 the wheel again engages the surface of the work, and between the lines 126 and 127 unevennesses of surface are eliminated by reason of the high speed of the work with the wheel running at cutting speed. At the line 127 the speed of the wheel is reduced by engagement between the outer end of the lever 73 and the cam 74, this engagement loosening the belt tension and permitting belt slippage to lessen the speed, and between the lines 128 and 129 the traversing wheel 35 running at polishing speed is giving the work surface a polish finish.

The finish polishing is complete at the line 129 and between the lines 129 and 130 the feed cam moves the wheel radially away from the work surface. The carrier 46 rises between the lines 131 and 132 to be out of the way during the discharge of the work piece from the work holder, which may take place at the line 133.

I prefer to keep the work holder revolving during discharging and recharging but this is not essential.

The ejector member 77 rises between the lines 134 and 135 loosening the chuck and raising the work piece into position for easy removal at the line 133 which may be coincident with the line 135. The removal of the work piece may be automatic or by hand.

As illustrated in Figure 2 the removal is an automatic one. A double hook member 136 is mounted to revolve about a suitable shaft 137 in synchronism with the motion of the turn-table so as to move in and carry away each work piece as it reaches the position 133 of Figure 3. The mechanism for effecting synchronous rotation of the hook member 136 with the rotation of the table is not shown and rotation may be effected in any suitable way as by suitably gearing the shaft 137 to the mechanism rotating the table or by separate drive as preferred.

A similar double hook member 138 is shown for automatically charging the work holder with a new piece.

At the time of charging the chuck operating member 77 is still raised and the hook member 138 moves a work piece to the top of the member 77 in registry with the mouth of the chuck. The member 77 now moves down and the work piece follows it into the open chuck to find seat upon a shoulder 91 of the chuck.

The member 77 continues to move further down, which tightens the chuck.

The revolving charging member 138 is somewhat raised with respect to the top of the work piece after the work piece has obtained seat upon the shoulder 91 in the chuck so that it now has clearance for moving away.

The wheel 35 speeds up when the lever 73 passes the end 97 of the cam 74. This cam may be, if desired, merely long enough to obtain the speed reduction during the period between the lines 127 and 129 for finish polishing.

From my illustration above it will be evident that the control of the feed and extent of feed of the wheel, the withdrawal of the wheel, the time, extent and vertical reciprocations and vertical withdrawals of the wheel and time of opening and closing of the chuck are all capable of cam control and by this or other means can hence be varied to follow any sequence and any interrelation, one with the other or others, required by the work involved or suited to the preference or whim of the designer. Likewise the wheel speed and the chuck speed are within the control of the designer both as to the number of speeds and as to the time of change of speed. The face grinder is also within the control of the designer as to time and rate of speed of grinding. Its operation may moreover be given any of the refinements of movement, speed or change of speed and withdrawal preferred by the designer. All of these "elements" in the operation and control are illustrative merely and can be varied individually to provide other ways and means, not restricted to mechanical ways and means, for carrying out the invention.

I thus provide a flexibility of control and adaptability to every character of automatic internal grinding equal to the individual automatic grinder. The whole structure is organized to carry a plurality of grinding units through their successive cycles of operation and control therein in whole or in part by means common to all.

In the structure of Figures 1 and 2 the turntable 25, the grinding wheels 35 and the work holders 52 are driven from a single motor 31. However, I consider that it usually will be preferable to have individually driven work holders, the requisite mechanism being then more simple and better adapted to changing respectively the speed of the wheel and the speed of the work according to the stage of the operation. This is illustrated in the fragmentary Figure 4.

Figure 4:
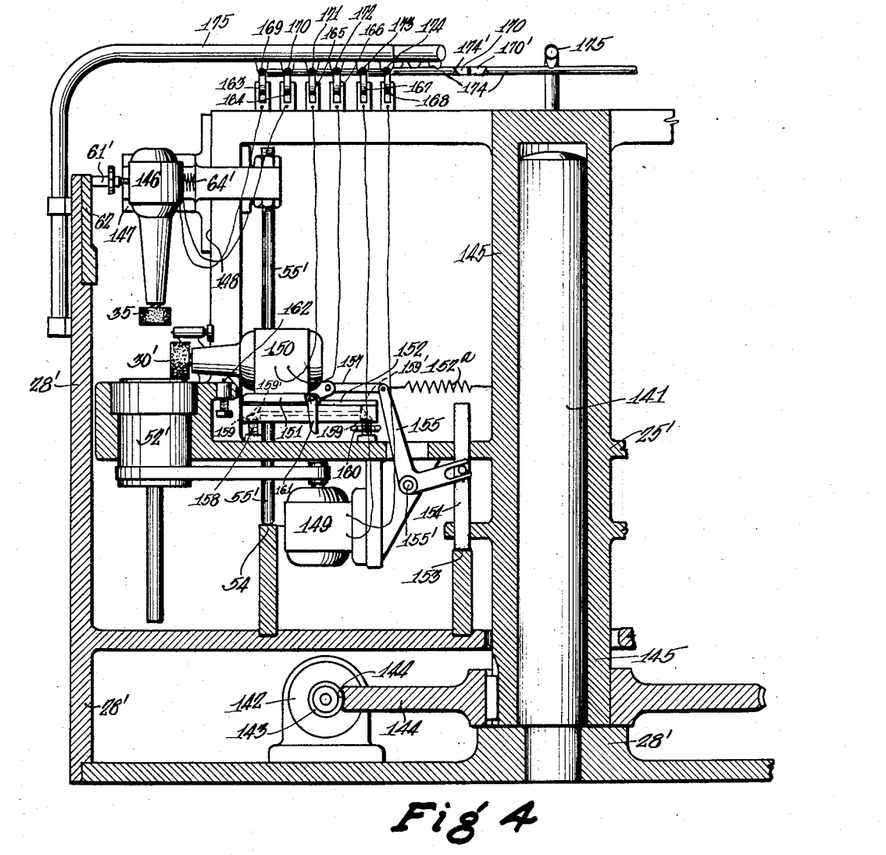
Figure 4 is a broken elevation showing individual drives for the grinding units and an individual facing wheel.

In Figure 4, the turntable has vertical journal support upon a central post 141 of the stationary supporting structure and is rotated by motor 142, the shaft of which carries a worm 143 meshing with a gear 144 upon the hub 145 of the turntable.

Each wheel unit includes a motor 146 and is radially movable along and is supported by a carrier guideway 147, that moves vertically up and down in a traverse slideway 148 of the turntable, being vertically positioned by a depending rod 55' that is moved up and down by the traverse cam 54 as in the structure of Figure 1.

The wheel unit is pressed outwardly along the carrier by a spring 64' to present the outer end of a feed screw 61' continuously against the feed cam 62.

The individual work holders or chucks 52' are belt driven by individual motors 149 carried by the table.

In the structure of Figure 1, one facing wheel operates successively upon the work pieces of all the grinding units. In Figure 4 however, each grinding unit includes a facing wheel 30' traveling with the turntable. It is inoperative in a position out of the way of the operation of the wheel 35 except at one portion of the orbit, when it moves in and faces the end of the work piece when the wheel 35 is up out of the way.

A single facing wheel mounted to operate nearly continuously, one after the other upon the work pieces of successive units, has the advantage of requiring only one facing wheel and one operating mechanism and might be used.

In the arrangement of Figure 4 the facing wheel unit (which includes a motor 150 and wheel 30') is mounted upon a base 151 adapted to radially reciprocate along a vertically adjustable carrier 152, being slid radially outward to operating position against the retraction of a spring 152a when the high portion of the face cam 153 engages and lifts the rod 154 to forwardly rock a bell crank 155 that is pivoted at 155' and is operatively linked at 157 to the carrier 151.

The carrier base 151 is supported on screw legs 158 connected by beveled gears 159, 159' for simultaneous adjustment.

One of the screw legs carries a star wheel 160 and each time the wheel unit is moved forward for facing duty, a pawl 161 on the carrier engages the star wheel to give it a very small downward feed. During its forward travel the wheel is trued by passing across the face of a diamond 162 whose height is adjustable.

The motors 146, 150 and 149 are fed by trolleys 163, 164, 165, 166, 167 and 168 respectively. These trolleys are carried by the turntable and make sliding contact with feed busses 169, 170, 171, 172, 173 and 174 which are supported above the turntable upon suitable standards 175 from the supporting frame structure 28'.

The speed of the motors 149 operating the work holders is preferably increased during finish grinding and the speed of the motors 146 of the grinding wheels 35' is preferably greatly reduced just after finish grinding for polishing.

These selective changes of speed are preferably accomplished by having the trolleys feeding the respective motors engage different sets of bus bars on different voltages at the desired positions of the orbit. I have illustrated this in the case of one pair of bus bars and trolleys only but it can be applied of course to any of them. In the figure the bus bar 174 is broken away at 174' to show the bus bar 170 and a section of bus bar 170' insulated from it but circumferentially in line with it, i. e. at the same diameter and during this part of the turn taking the place of the bus bar 170. The point selected for this section 170' has been selected for convenience of illustration and not as the point at which the slowing of speed would occur.

If the bus bar 170' be of lower voltage than the bus bar 170 (as compared with the other bus bar 169) the speed will be reduced to a finish grinding or polishing speed. As many different sections of bus bar may be inserted as are desired for the speeds intended and the bus bar 169 may be similarly interrupted to put in sections of bus bar not shown insulated from it and intended to cooperate with one or more sections 170' interjected in the bus bar 170. The point of breaking away of bus bar 174 at 174' could thus represent the point at which a change of speed of the facing wheel 30' takes place as this facing wheel is subject to the same speed control for grinding, finish grinding and polishing as is the grinding wheel.

An advantage of placing the facing motor upon the turntable is that the facing wheel may remain in radial engagement with the work during face grinding, i. e., the wheel will not vary its position during grinding with respect to the nearest radii of the work.

The appearance of the faced end is better if the finish face grinding has been done with the grinding wheel radial to the work, and for this reason in the arrangement of Figure 1 the facing wheel is synchronized to leave the work when the rotation of the turntable brings the work into position in which the wheel is radial to the work.

Figure 5:
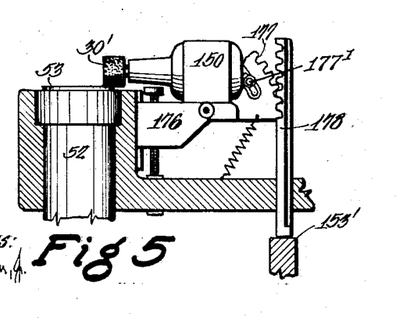
Figure 5 shows a modification that otherwise may be considered as a fragment of Figure 4.

Figure 5 shows a different form of facing wheel unit mounted to revolve with the turntable, as in Figure 4.

Here the wheel unit, including motor and facing wheel, is pivotally supported upon a vertically adjustable carrier 176 and carries a sector 177 (angularly adjustable with respect to it as at 177') which sector meshes with a vertically slidable rack rod 178, operated by the face cam 153' to bring the wheel into grinding position and to lift it from operating position as desired.

The work holders contemplate any structures adapted to properly present the revolving work pieces to the operations of the internal grinding wheels.

In the structure shown in Figures 1, 2, 4 and 5 the work holders are chucks that revolve concentrically with the respective work pieces, the operation then involving what I have called centered grinding as distinguished from the centerless grinding, about to be described. In centerless grinding the work pieces are positioned between idler pulleys on one side and a cooperating external driving member on the other. The driving member may be stationary but is preferably revolving or traveling and that may be a belt or a metal rim.

Figures 6, 7, 8, 19:
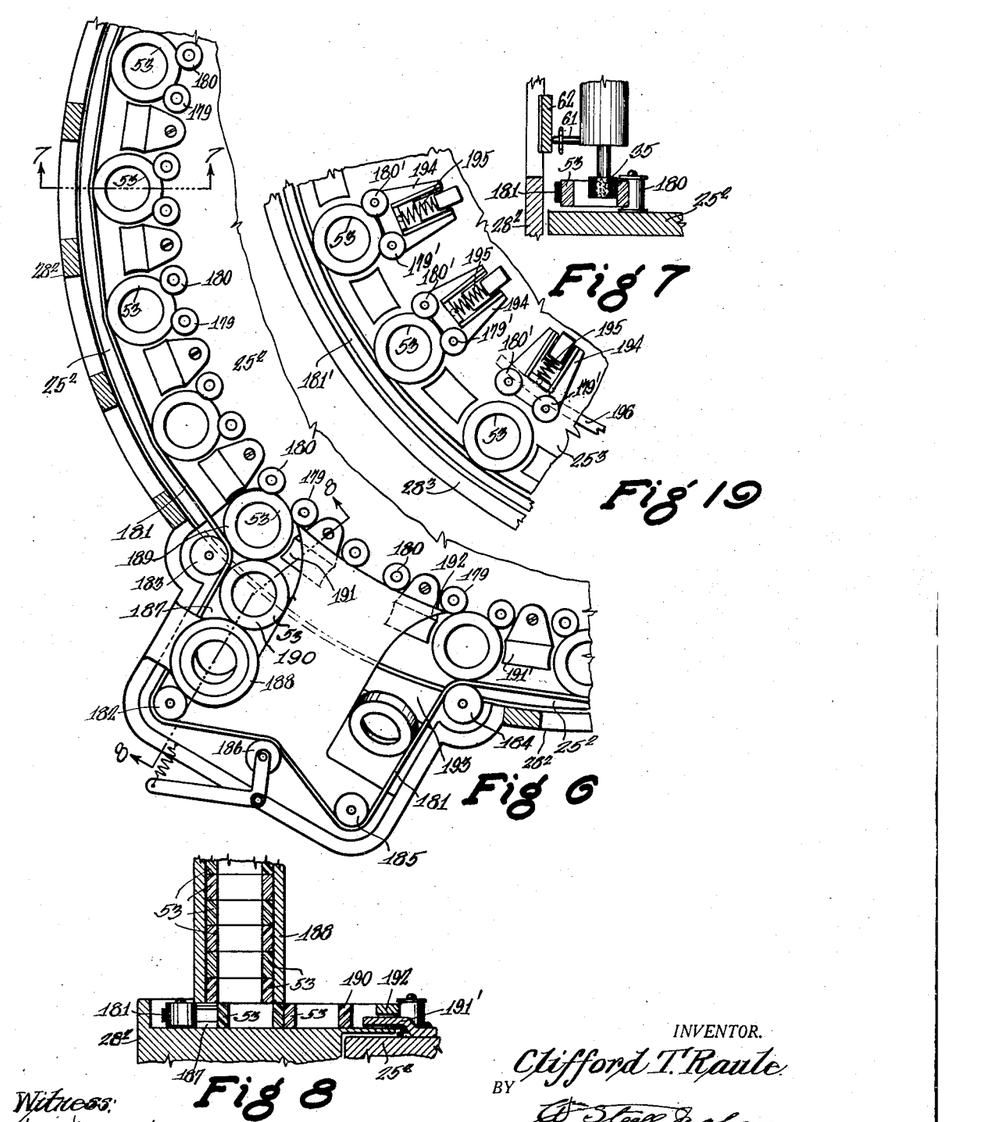
Figure 6 is a fragmentary diagrammatic plan view illustrating chucking mechanism.
Figure 7 is a vertical section taken upon line 7—7 of Figure 6, and showing also wheel and wheel-feed mechanism omitted in Figure 6.
Figure 8 is a vertical section taken on the line 8—8 of Figure 6.
Figure 19 is a fragmentary plan view of another form of grinding mechanism.

In the structure of Figures 6 to 8, the turntable $25^2$ carries circumferentially spaced pairs of idler pulleys 179 and 180, and the work pieces 53 are held to place between the cooperating idlers of the individual pairs upon the inside and a driving belt 181 upon the outside, the grinding wheel units operating upon the respective work pieces as already described.

The belt moves around the work table, engaging and rotating all of the work pieces, and makes an offsetting travel around the charging and discharging positions upon pulleys 182 and 183, 184 and 185 carried by the stationary supporting frame $28^2$.

The belt may be driven by any pulley such as 185 in any suitable way not shown, and is maintained at proper tension by an idler 186 spring pressed against the belt.

The work pieces 53 are charged and discharged automatically by the traveling belt. The pieces enter along a charging guideway 187 from the open bottom of a stationary supply tube 188.

The bottom piece in the tube is in the guideway and in outside engagement with the traveling belt which rolls it along the guideway to the turntable as fast as members ahead of it get out of the way.

In the position shown in Figure 6, a work piece 189 has just been charged so as to engage a pair of rollers. It is being followed by the piece 190, which will maintain contact with the first piece until temporarily held back by the outer edge of a guard 191 on the turntable. After this guard passes, the work piece 190 rolls to place against the next pair of rollers to come into position.

At the position of discharge, the work piece meets a stationary deflecting horn 192 which turns it into a guideway 193, where it is engaged and pushed out of the way by the guard member 191' to fall through an opening into any suitable receptacle.

In the form shown in Figure 19 each pair of rollers 179' and 180' is mounted upon a radially slidable carrier 194. These carriers are circumferentially spaced around the turntable and are spring pressed outwardly at 195.

The work pieces 53 are positioned between each pair of pulleys 179' and 180' and the inner circumferential face of a wheel or rim 181' surrounding the turntable and preferably revolving with respect to the turntable in the direction of the arrow at any desired speed to rotate the work pieces.

The view is diagrammatic and it has not been considered needful to illustrate driving structure for this wheel.

On one side of the machine a stationary cam 196 successively retracts the carriers 194 for a short distance at the end of the grinding cycle and the finished pieces are taken out and unground pieces are inserted by hand during this retraction.

Figure 9:
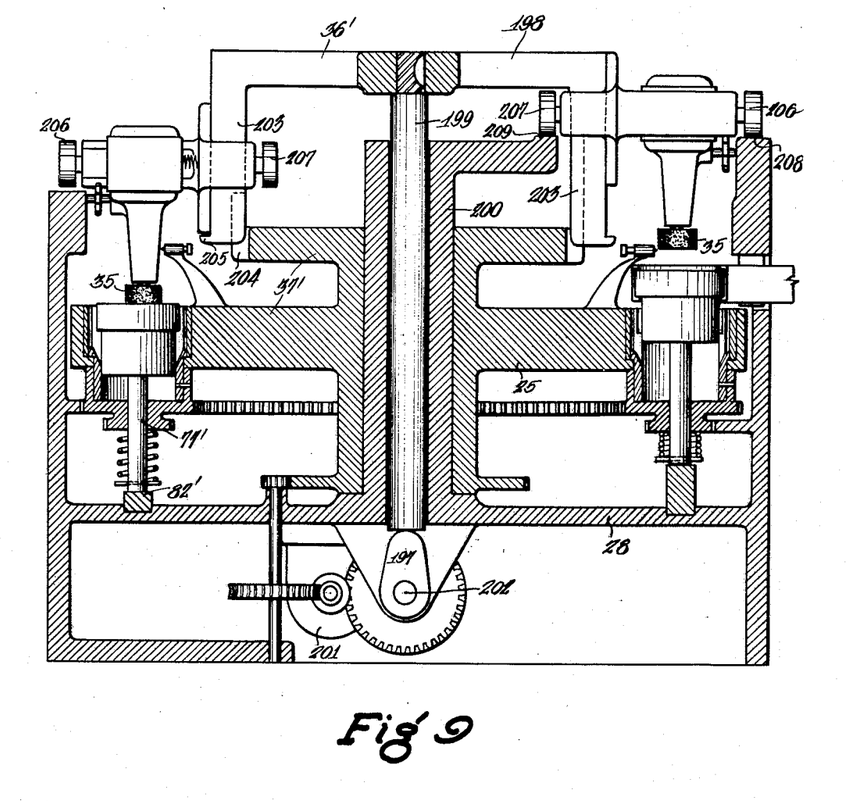
Figure 9 is a vertical section illustrating a different form of wheel traverse.

Figure 9 illustrates a modification of the traverse and wheel supporting mechanism shown in the earlier figures.

In the structure of Figures 1 and 4 the vertical wheel traverse is effected by the engagement of depending members from the individual wheel carriers with an undulatory face cam 54 along which the members travel one after the other.

In the structure of Figure 9 the traverse is effected by a revolving cam 197 which causes vertical traverse simultaneously of all of the wheel units that are in grinding position.

The upper portion 36' of the turntable carrying the wheel units is adapted to vertical reciprocation with respect to the lower portion 37' supporting the work holders. It comprises a spider 198 keyed to the upper end of a central shaft 199 inside a stationary tubular bearing 200 pivoting the lower portion of the turntable.

A motor 201 is geared on one side to rotate a shaft 202 carrying the reciprocating cam 197 which supports the lower end of the central shaft and on the other side is geared to rotate the lower portion of the turntable.

The upper and lower portions of the table rotate together, one or more depending arms 203 of the spider making a vertically sliding engagement with a face 204 of the lower table.

The wheel carriers are vertically slidably mounted on the depending arms 203 of the spider.

During traverse grinding each wheel carrier is in its low position upon the arm 203, being supported against further downward travel by a suitable stop 205 on the arm.

The wheel carriers are provided with rollers 206 and 207 located radially inward and radially outward, respectively, of their points of support from the upper part of the table. These rollers engage cams 208 and 209 upon the stationary frame structure at that portion of the circuit at which it is desired to raise the grinding wheels from the work.

The reciprocation of the spider has then no effect upon the raised carrier, the depending spider arm 203 sliding in the carrier which is maintained in raised position until the rotation of the table brings it beyond the cams 208 and 209.

Other mechanism of Figure 9 may be similar to that already described but the operating member 77' of the work holder is shown as spring pressed downwardly to engage the face cam 82' instead of being positively positioned by a grooved cam 82.

Figure 10:
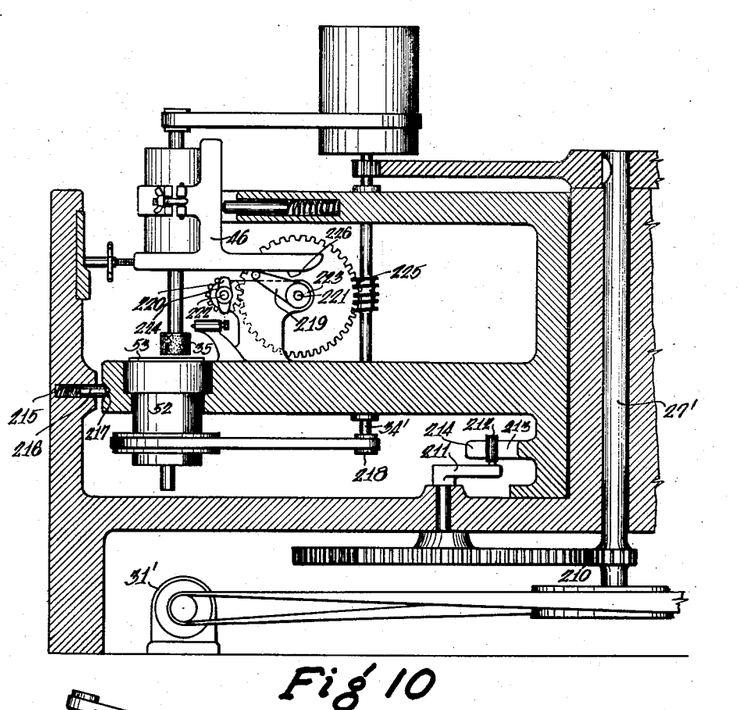
Figure 10 is a fragmentary vertical section illustrating an intermittent drive and a different form of traverse mechanism.

While I prefer to have the turntable rotate continuously, an intermittent motion is permissible and in particular cases offers some advantages, in that the face grinding and hand charging and discharging may operate during the dwell periods. Figure 10 illustrates structure in which the turntable has intermittent motion.

The main driving shaft 27', belt driven from a motor 31' is gear connected at 210 to rotate a crank 211 carrying a pin 212 adapted to register with the successive slots 213 of a geneva wheel 214 fastened to the turntable.

One or more spring latches 215, spring pressed radially inwardly from a socket 216 in the stationary frame structure, engage successive recesses 217 in the rim of the turntable, to exactly position the turntable during each period of dwell.

Much of the remaining mechanism is that of Figure 1 and will, therefore, not need description. The work holders are belt driven from pulleys 218 on the extended lower ends of the shafts 34', and the traverse and withdrawal and entry motions of the wheels are effected by rotary mechanism upon the turntable instead of by the stationary face cam 54 of Figure 1.

Each grinding unit here includes a slowly rotating crank 219 adapted to periodically engage and raise the carrier 46 for wheel withdrawal and a more rapidly revolving cam 220 adapted to traverse the wheel except during the period of wheel withdrawal by the crank 219.

The crank and cam are mounted upon shafts 221 and 222 in bearings 223 and 224 on the table at each unit.

The crank shaft 221 is worm driven at 225 from the shaft 34' and has gear and pinion connection with the cam shaft 220.

The operation of the crank shaft should be synchronized with the turntable to engage and lift the wheel carrier at the desired position of the circuit and the surface 226 of the carrier periodically engaged by the crank pin (shown as straight and horizontal in the figure) should be so shaped as to cooperate to obtain the desired movement.

When applied to internal taper grinding, preferably during the grinding operation either the wheel or the work is inclined to the horizontal. A straight wheel is then used as in straight grinding. Optionally, however, a taper wheel may be used when the wheel grinds the entire surface at one time. The taper may be given by the path of traverse either with a straight or tapered wheel.

Figure 11:
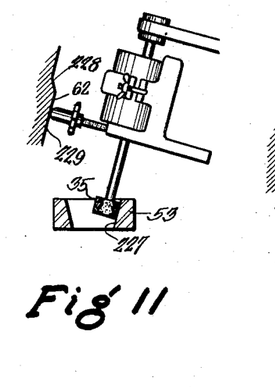
Figures 11 and 12 are diagrammatic fragmentary views showing different ways of grinding taper.

Figure 11 illustrates taper grinding with a straight wheel inclined. The revolving work is held horizontal in a work holder—not shown—and is internally taper ground by means of a straight wheel 35 that may be generally similar to that of Figure 10 except that it is inclined. The line of traverse (as determined by the slope of the feed cam 62) is parallel to the taper surface of the work 53 along the line of grinding contact at 227. The offset 228 shown above the traverse portion 229 of the feed cam sets back the wheel from the work before the complete withdrawal of the wheel from the work interior.

Figure 12:
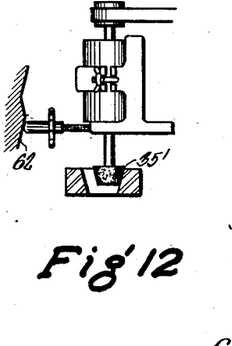

In Figure 12 the wheel 35' is tapered, the structure otherwise being similar to that of Figure 11 The wheel traverse, as with the straight wheel, is inclined by inclining the feed cam 62.

Generally a straight wheel is more desirable than a tapered wheel. The circumferential speed of the grinding surface is constant throughout the length of the wheel when the wheel is straight and variant when it is tapered. With the tapered wheel the traverse must stop just at the right joint. The difference in peripheral speed of different portions of a tapered wheel results in less effective grinding and in a less uniform finish surface. The diamonding operation is perhaps also less easy if the wheel be tapered than if it be straight.

Figure 16:
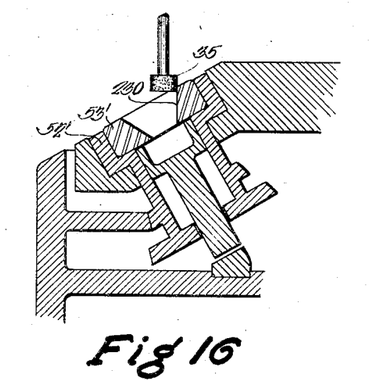
Figure 16 is a diagrammatic sectional view of a fragmentary section showing another way of grinding taper.

In Figure 16, the revolving tapered work pieces 53' are inclined the amount of the taper, the pieces being held in any suitable inclined chucks 52' so as to present a vertical line 230 to the vertically traversing wheel 35.

Figure 13:
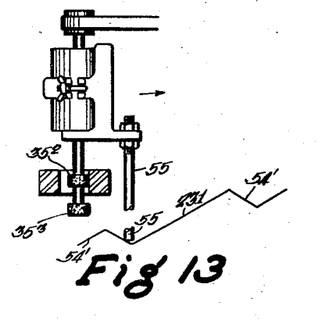
Figure 13 is a fragmentary view showing the wheel spindle provided with two wheels for use at different stages of the grinding operation.

Optionally each grinding unit may carry more than one wheel for use at different stages of the cycle, and I have shown this in Figure 13, where an upper wheel 35² may be used during rough cutting and a lower wheel 35³ during finish grinding and polishing.

In this figure the grinding unit is shown as at the end of rough cutting, the bottom of the traverse rod 55 being about to ride up an inclined portion 231 of the traversing face cam 54' to lift the wheel carrier to withdraw the roughing wheel 35² from the work and to bring the finish wheel 35³ into grinding position.

The feed cam 62 is preferably formed to avoid wheel engagement with the work during this change of wheels, the feed rod 61 finding a suitable depression in the feed cam 62 as the rod 55 runs up the slope 231, the rod 61 entering the depression and permitting the roughing wheel to step back radially from the work just before the roughing wheel has moved up out of the work, and leaving the depression after the finishing wheel has entered the work so that the finishing wheel engages the work radially.

Figure 14:
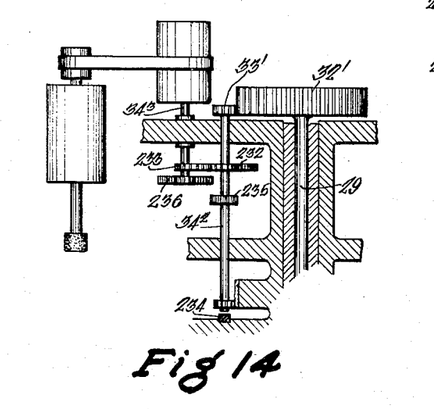
Figures 14 and 15 are fragmentary views showing modified ways of varying the speed of the wheel according to the angle of position of the grinding wheel.
Figure 15:
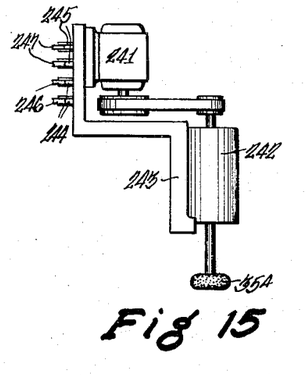

Figures 14 and 15 illustrate different ways of effecting an automatic change of wheel speed. Figure 14 may be considered as a detail modification of the structure of Figures 1 and 2 and Figure 15 as a detail modification of the structure of Figure 4.

Each individual driving shaft 34 of the respective wheels 35 of Figures 1 and 2, in the structure of Figure 14, have been replaced by two shafts 34² and 34³ respectively, the shaft 34² being driven continuously at a uniform rate of rotation by its pinion 33' meshing with the long gear 32' on the main drive shaft 29, and driving the shaft 34³ by interchangeable gearing of different ratios, the shaft 34³ being belt-connected to the wheel 35 as in Figure 1.

For the major portion of the cycle, that of grinding, the drive is from the larger gear 232 of the shaft 34² to the smaller gear 233 on the shaft 34³.

After finish grinding, a stationary arcuate face cam 234 of the stationary frame structure engages and lifts the bottom of the shaft 34², sliding the shaft 34² upwardly to shift the gearing to the shaft 34³, moving the upper and larger gear 232 out of mesh with the pinion 233 and the pinion 235 into mesh with the gear 236, causing the wheel 35 to run at reduced speed for polishing.

Figure 17:
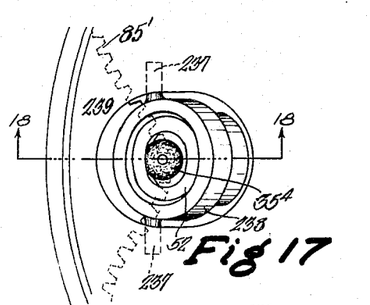
Figures 17 and 18 are fragmentary sectional views illustrating one way of radial grinding.
Figure 18:
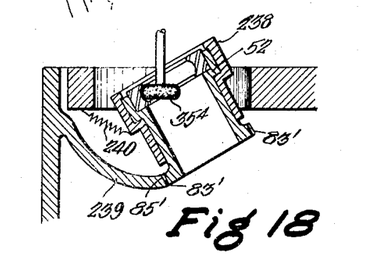

Figures 17 and 18 illustrate an adaptation of my invention to curved internal grinding.

In curved internal grinding the wheel 35⁴ has a curved face of lesser curvature than the desired curve of finish grinding. It is fed progressively into the work along the grinding orbit as already described but has no traverse, the traverse being of the work and along a curved line such that the grinding face of the wheel generates the desired curve with respect to the work surface.

In the structure shown the curve is "radial," that is, arcuate and the revolving work holder 52 is given an arcuate oscillation on trunnion spindles 237 projecting from a bearing 238 of the work holder along the axis of the desired curve, and journalling in the turntable.

The holder carries a gear 83' at its lower end which meshes with stationary gear teeth 85' around an undulating surface cam 239 upon the stationary supporting structure.

As the turntable rotates the work holder is rotated in its bearing by rolling upon the teeth presented by the undulating cam and the bearing oscillates upon the trunnions to generate the desired curve between the work piece and the engaging surface of the wheel.

The bearing 238 is shown spring pressed at 240 to maintain meshing engagement between the gear on the work holder and the teeth around the undulating cam.

The grinding unit having no traverse may be as illustrated in Figure 15, where the unit includes a motor 241 and wheel unit 242 belt connected and mounted upon a carrier 243.

The motor is shown with two sets of trolleys 244 and 245 to engage with the stationary feed buses 246 and 247 carried by the supporting structure and operative at different stages of the orbit to drive the wheel at different speeds.

Figure 20:
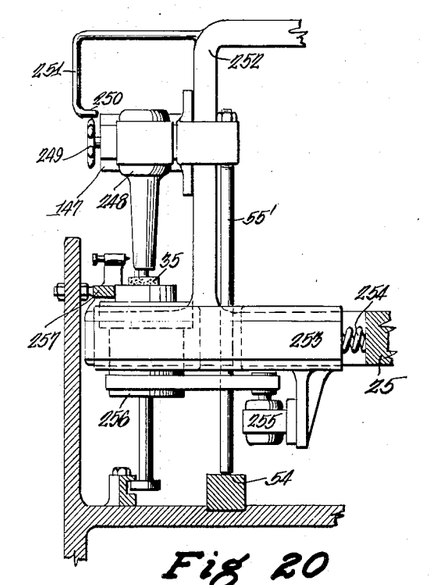
Figures 20 and 21 are a fragmentary sectional elevation and a fragmentary plan respectively of different forms of feed.

In the structure shown in Figure 20 the step back of the wheel from the work is effected by a star wheel screw adjustment in the position of the wheel unit upon a carrier along which it is radially adjustable, while the progressive feed for grinding is applied to the work instead of (as in the structure of the earlier figures) to the wheel.

The grinding unit is similar to that of Figure 4 except that the wheel unit 248 is positioned by screw adjustment radially along its supporting horizontal guideway 147 instead of being spring pressed radially outward to engagement against a feed cam.

When the rotating table 25 brings the unit to position for wheel withdrawal, the wheel carrier 248 is raised by the depending member 55' sliding up a high portion of the cam face 54 and before the wheel is withdrawn from the work the star wheel 249 engages the radially projecting end 250 of a rod 251 carried by the upper portion 252 of the turntable, and the wheel unit is thus given an inward screw feed upon its guideway support 147, stepping the wheel from the work before wheel withdrawal.

On its return downward travel the star wheel again engages the end 250 after the wheel is again within the work interior thus stepping the wheel back to the work.

The work holder unit includes a radially slidable carrier 253 spring pressed outwardly at 254, a motor 255 and a work holding revoluble chuck 256, the motor and chuck being belt connected and mounted on the carrier.

The feed cam 257 engages the outside of the carrier and in doing so limits the outward position of the slidable carrier 253.

As the table 25 rotates the feed cam progressively pushes the carrier 253 radially inward while the traversing wheel 35 has no radial feed but does have the star step over at wheel insertion and wheel withdrawal.

Figure 21 illustrates a form in which the feed between the wheel and work is by successive star wheel adjustments around the operating orbit instead of by means of a peripheral feed cam.

The grinding units are shown generally similar to those of Figure 20, while the work holding mechanism, not shown, may be that of Figures 1 and 2.

The star wheels 249 of the wheel units 248 successively engage, during their operating orbits successive circumferentially spaced projections 258 from the stationary supporting structure 28, each engagement giving a small radial screw-adjustment in the position of the wheel unit 248 along its horizontal guideway support 147.

There are two sets of stationary projections 258 placed to engage opposite sides of the star wheels, one set of projections 259 feeding the wheel by successive small steps into the work, shown as engaging the upper sides of the star wheels, and the other set 260, relatively closely spaced and shown as engaging the lower sides of the star wheels, returning the wheel to its initial position for the next cycle.

The return of the wheel to its initial position should take place between the lines 132 and 93 of Figure 3, that is in the portion of the orbit between wheel withdrawal for discharge of a piece of finished work and the beginning of the downward travel of the wheel to enter the new work piece of the next cycle.

In accord with this the projection 261 (being the first of the set 260 for returning the wheel) is placed at or somewhat after the line 132 and the last projection 262 of this set is placed at or before the position 93.

The first of the forwardly feeding projections 263 should preferably be placed at the position 94 of Figure 3 which is the earliest moment that the wheel is within its range of traverse grinding for a new work piece. The last of the forwardly feeding projections 264 may be at the position 103 of Figure 3, or just before diamonding preparatory to finish grinding.

The portion of the orbit taken up by the return projections 260 is shown exaggerated in Figure 3. In practice the return should usually be completed by the time a new piece enters the work holder, a pinion portion of each star wheel rolling around a short arcuate rack between the positions for discharging a finished piece and charging a new one. It has not been deemed necessary to show this as the figures are all to a very large extent diagrammatic.

Though the illustration herein has been restricted to internal grinders, much of the invention embodied obviously is broad enough to cover both internal and external grinding operations and it is my intention herein to include claims upon the bodily carriage of separate units and operations upon or by them which are controlled by outside means common to all of the units, which claims apply equally well to carriers supporting and moving, through a path centering or centerless work holders with whose work separate grinding wheels engage interiorly or carriers supporting and moving work holders of the centered or centerless variety traveling through a path and engaging a common wheel to externally grind, intended to be copending herewith.

As will be seen, both include work holders whether of center or centerless variety carried throughout a path and with common feeding and reciprocating mechanism adapted relatively to feed and reciprocate the work or the wheel, one with respect to the other.

Moreover the change of speed of the work for finished grinding to remove chatter or other vibrational marking and the capability of applying different wheels or different rates of wheel speed for polishing as well as the automatic loading and unloading features are applicable to both forms. My later claims therefore are to be interpreted as applying equally to external and internal grinding.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a grinding machine, a plurality of separate grinding units transversely fed, comprising each a grinding wheel, driving mechanism therefor and a work holder adapted to rotate work, means for moving the grinding units around an endless path, and means for moving the grinding wheels within the work pieces in all of the units to bring them into contact with the work at rates determined by the rates of movement about the path.

2. In a grinding machine, a plurality of separate grinding units comprising each a grinding wheel adapted to traverse, driving mechanism therefor and a work holder adapted to rotate a work piece, means for moving the grinding units around the same endless path, means for tightening the work holder upon the work received, means for traversing the wheel, means for feeding the wheel transversely against the work, means for removing the wheel from the work and means for releasing the work holder, performing the operations that are the same at the same positions of the path for all the units.

3. In a grinding machine, a plurality of separate grinding units, comprising each a grinding wheel adapted to traverse, driving mechanism therefor and a work holder adapted to rotate a work piece, means for moving the grinding units around the same endless path, means for successively acting upon the grinding units by means from the outside at the same positions progressively in the travel of the units to complete the grinding, to step the wheel back from the work, to remove the wheel from the interior of the work, and to diamond the wheel.

4. In a grinding machine, a plurality of grinding units comprising each a grinding wheel, driving mechanism therefor and a rotary chuck, means for moving the grinding units about a path, means for successively acting upon the grinding units by outside means at the same positions progressively in the travel of the units to complete the grinding, to step the wheel back from the work, to remove the wheel from the interior of the work and to diamond the wheel, at a definite position of the path while the other steps are being performed in other units at different positions.

5. In a grinding machine, a plurality of grinding units comprising each a grinding wheel, driving mechanism therefor and a rotary chuck, means for moving the grinding units about a path, means for swinging the grinding wheels in directions substantially radial to the axis of the path and about axes at a distance from their own axes to feed them against the work by outside lateral pressure common to all and concurrently reciprocating the wheels.

6. In a grinding machine, a plurality of grinding units, comprising each a grinding wheel, driving mechanism therefor and a rotary centering chuck, means for moving the grinding units about a path, means for tightening the chucks, means for reciprocating the wheels within the work, means for feeding the wheels against the work by outside lateral pressure and means for removing the wheels from the work laterally and vertically, all at the same respective periods for each of the units involved and all by lateral pressure outside of the grinding units and common to all of them.

7. In a grinding machine, a plurality of grinding units, comprising each a grinding wheel, driving mechanism therefor and a rotary chuck, means for moving the grinding units about a path, means for feeding the work to the chucks, means for setting the chucks, preliminary to grinding within the successive units, means for removing the grinding wheels from the units, means for facing the units, means for releasing the chucks and removing the work all successively and progressively, each of the means including parts outside of the units rendered effective by the travel of the units about their path.

8. In a grinding machine, a plurality of separate grinding units, comprising each a grinding wheel, driving mechanism therefor and a rotary chuck, means for moving the grinding units about a common path, means for feeding the grinding wheels of the units against the work, means for reciprocating the grinding wheels with respect to the work, means for placing and removing the grinding wheels within and from the work rendered operative by constraining the moving parts as they travel along the same orbit, and means for opening the chucks to hold each open for an interval in each complete travel about the path to remove one piece of work and to supply another.

9. In a grinding machine, a plurality of separate grinding units, comprising each a grinding wheel, driving mechanism therefor and a rotary chuck, means for moving the grinding units about an endless path, and means for shifting the grinding surfaces to grind each of the pieces of work first with one grinding surface and subsequently with another grinding surface for the finishing operation, shifting at the same point in the travel of the successive units.

10. In a grinding machine, a plurality of separate grinding units comprising each a grinding wheel, driving mechanism therefor and a rotary chuck, means for moving the grinding units about an endless path, and means for successively shifting the units at the same point of the common path from one rate of speed of rotation of the work to a different speed of rotation of the work.

11. In a grinding machine, a plurality of grinding units comprising each a grinding wheel, a work holder adapted to rotate a work piece and means for giving the wheel and holder rotation, means for moving the grinding units bodily about a path or orbit and means outside of the units for impressing the movements of the grinding wheel axially of the wheel and transversely to it requisite for the grinding operations upon the successive units as they move through their paths or orbits.

12. In mechanism operating successively and concurrently for different parts of their orbit of travel upon a plurality of pieces of work, a plurality of grinding units comprising each a grinding wheel, a rotary chuck and means for giving the wheel and chuck rotation, means for moving the units bodily about a predetermined path and means effecting the relative feed and reciprocation of the grinding wheels and work by reaction from the bodily movement.

13. In an internal grinder, the combination of a rotatable table with a plurality of grinding units thereon comprising rotatable chucks and rotatable grinding wheels, each grinding wheel being adapted to move toward and from the surface of work to be ground, means for rotating the chucks and grinding wheels, automatic means for reciprocating the grinding wheels as the table rotates, common to all of the grinding units and acting upon them successively alike at the same parts of their path of revolution, and means, common to all, feeding the grinding wheels of the units to present grinding surfaces at the same distances at the same positions about the path of travel of the grinding units.

14. In an internal grinder, a rotatable table, a plurality of grinding units thereon comprising rotatable chucks and rotatable grinding wheels, each grinding wheel being adapted to move toward and from the surface of work to be ground, cam reciprocation and cam feed for the grinding wheels adapted successively to place the wheels within the work, to reciprocate them and lift them out of the work and to feed the wheels during reciprocations.

15. In an internal grinder, a rotary table, a plurality of grinding units carried by the table and spaced around it, each comprising a rotatable work chuck and a rotatable grinding wheel adapted to move within the work in the chuck and be fed against it at the same speed in the same part of the rotation of the table and speed altering means common to all for rotating the chucks at a different speed during a further part of the rotation of the table.

16. In an internal grinder, a rotatable table, a plurality of like grinding units thereon comprising grinding wheels, and work holders operating therewith, means for rotating the wheels, driving connection for the work holders and a second driving connection for the work holders, both driving connections being common to all the work holders and successively engaged by them.

17. In an internal grinder, a rotatable table, a plurality of like grinding units spaced therearound comprising grinding wheels, work holders operating therewith, means for rotating the wheels, driving connections for the work holders, a second driving connection for the work holders, both driving connections being common to all the work holders, connections common to all being made with the driving connections at different parts of the rotation of the table for changing the speed of the work holder, and driving connections for rotating the grinding wheels during the rotation of the work holder.

18. In an interior grinding machine, a rotary table, means for rotating the table, a plurality of work drivers carried by the table, means common to all for engaging and driving the work drivers, a grinding wheel for each work driver, means for reciprocating and feeding the grinding wheels and means controlling the grinding wheel engaged as to each grinding unit during the course of its travel along its path and feeding the grinding wheel of each unit in the same manner and to the same extent at the same part of the work and to the same extent at the same part of the circuit.

19. In an internal grinder, a rotary table, a plurality of grinding units carried by the table, each comprising rotatable work holders and rotary grinding wheels adapted to cooperate therewith, in combination with cam directing devices for feeding the wheels, common to all of the units, cam operated reciprocating devices for the wheels and speed control devices common to all of the wheels for reducing the speed of the wheels at the same part of their bodily movement with the table.

20. In an internal grinder, a rotary table, a plurality of grinding units carried by the table, each comprising rotatable work holders and rotary grinding wheels adapted to cooperate therewith, in combination with feeding and reciprocating devices common to all of the wheels, withdrawing the wheels from contact with the work when the grinding is completed and lifting the wheels free from the work after withdrawal.

21. In an internal grinder, a rotary table, a plurality of grinding units carried by and spaced around the table, each comprising a rotatable work holder and a rotary grinding wheel adapted to cooperate therewith, in combination with grinding and reciprocating mechanism for the wheels, work holder feeding mechanism for the work common to all of the units at the same point in their travel and automatic removing devices, carrying the work out of the work holders after this point.

22. In interior grinding mechanism, a rotary table, a plurality of centering chucks thereon, a grinding wheel for each work holder, automatic setting mechanism for each chuck operating on all to the same effect at the same points of travel for the chuck, feeding and reciprocating mechanism for the grinding wheels, common means for removing the wheels from the work when the grinding is completed, chuck releasing mechanism, common to all of the chucks and operating at the same point in the travel of each chuck and work engaging devices automatically removing the work from the chuck after the release of the chuck.

23. In an internal grinder, a plurality of grinding units comprising work holders and grinding wheels mounted to travel about the same path of bodily movement, means for reciprocating the wheels and feeding the wheels against the work during the rotation of the wheels and the bodily movement of the units, means for moving the grinding wheels away from the work and out of it when the grinding has been completed, a facing grinding wheel operating at a point in the bodily movement after removal of the first grinding wheels and automatic means for passing the facing grinding wheel across the face of the work at this time.

24. In an internal grinder, a rotary grinding unit support, a plurality of grinding units supported thereby, each comprising a work holder and a grinding wheel and connections for rotating the work holder and the grinding wheel, means for tightening the work holder to the work, a feed adapted to alter the position of the work with respect to the wheel common to all of the units, reciprocating mechanism for the grinding wheels common to all, a step back device for the grinding wheel, means for lifting the grinding wheel out of work and for reciprocating it while it is out of work to diamond the wheel, means for slowing the speed of the work holder and for again feeding the grinding wheel down into the work and reciprocating it for finish grinding and means for slowing the speed of the grinding wheel for polishing.

25. In a grinder wherein the plurality of pieces of work is rotated and translated bodily through a path common to all, a rotatable carrier, grinding units mounted upon the carrier and comprising work rotating and grinder rotating mechanisms and a guide surrounding the path of the units and adapted to be engaged in a movable member of each of the units to alter the position of the grinding tool with respect to the work, successively as they pass along the guide.

26. In a grinding machine a rotatable carrier, a plurality of grinding units mounted upon the carrier, each comprising a rotatable work holder and a rotatable grinding wheel, a fixed guide outside of the carrier common to all the units and engaging them in turn as they pass around to feed the grinding tool radially with respect to the work and retractive means for returning the units to their initial position when they have completed a circuit of them.

27. In an internal grinder, a plurality of duplicate grinding units each unit comprising a traversing grinding wheel and a rotatable workholder, one movable approximately radially with respect to the other, a guide common to all the units limiting their paths in one radial direction and resilient pressure means holding the movable members against the guide to cause the guide to determine their paths.

28. In an internal grinder, a plurality of duplicate grinding units each unit comprising a traversing grinding wheel and a rotatable workholder, one movable approximately radially with respect to the other, driving connections for the grinding wheels adapted to drive them at different speeds, a grinding speed and a speed below the grinding speed for polishing and connections for shifting from one driving means to the other at a point where the grinding has been completed.

29. In an internal grinder, a plurality of duplicate grinding units each unit comprising a traversing grinding wheel and a rotatable workholder, one movable approximately radially with respect to the other, driving connections for the grinding wheels adapted to drive them at different speeds, a grinding speed and a speed below the grinding speed for polishing, connections for shifting from one driving means to the other at a point where the grinding has been completed, the shifting mechanism being common to all of the units.

30. In an internal grinder, a plurality of duplicate grinding units each unit comprising a traversing grinding wheel and a rotatable workholder, one movable approximately radially with respect to the other and an internally facing cam about the path of the units engaged by the movable member of each unit and determining the relative position of the elements of each unit in turn at that point of its movement.

31. In an internal grinder, a plurality of duplicate grinding units each unit comprising a traversing grinding wheel and a rotatable workholder, one movable approximately radially with respect to the other, and a cam guide engaging a movable member of each unit to step its grinding wheel relatively away from its work preparatory to withdrawal of the wheel from the work.

32. In an internal grinder, a plurality of duplicate grinding units each unit comprising a traversing grinding wheel and a rotatable workholder, one movable approximately radially with respect to the other, a diamond for each wheel out of line with the traversing path of the wheel during grinding and means for setting back the wheel, moving it over the diamond and again bringing the wheel forward for its cutting function.

33. In an internal grinder, a plurality of duplicate grinding units each unit comprising a traversing grinding wheel and a rotatable workholder, one movable approximately radially with respect to the other, cam means for entering successive wheels in corresponding pieces of work and further cam means for successively stepping the wheels up to the surface of the work, common to all the wheels.

34. In an internal grinder, a plurality of duplicate grinding units each unit comprising a traversing grinding wheel and a rotatable work-holder, one movable approximately radially with respect to the other, means for progressively moving the units along a predetermined path and for reacting upon the units by reason of their movement to feed the grinding wheels progressively against the work, means for reducing the speed of the grinding wheels after finish grinding to polish, and means for removing the wheels from the work.

35. In a rotary multiple internal grinder, a plurality of grinding units spaced around a turn-table each unit comprising a grinding wheel and a work-holder, in combination with telltales on the individual units and means causing each telltale to operate when the grinding wheel of the unit has been reduced to any predetermined size beyond which it is deemed undesirable to have the wheel operate.

36. A rotary grinder having grinding units spaced around a turn-table each unit comprising a grinding wheel and a work-holder, truing diamonds on the individual units and mechanism for feeding the wheels periodically to the truing diamonds so as to maintain exact predetermined alinements of the grinding surfaces of the wheels despite wear and diamonding of the wheels in combination with an interrupter telltale for the operation of each wheel operative when the feed reaches any predetermined limit beyond which it is deemed undesirable to have the wheel operate.

37. An internal grinder adapted to grind a plurality of work-pieces concurrently as they move bodily along with grinding wheels through a path common to all of the pieces, in combination with means for facing the work during the movement of the pieces.

38. An internal grinder adapted to grind a plurality of work-pieces concurrently as they move bodily along with grinding wheels through a path common to all of the pieces, in combination with common means for facing the work during movement of the pieces.

39. In a protective device for grinders to indicate that the wear of the grinding tool has rendered it too small for further grinding service, a plurality of movable grinding units, comprising rotating work holders and grinding wheels for acting upon the work, the work-holder and the wheel being relatively movable in each unit, a rotary support for the units adapted to move them throughout a continuous path of movement and contacts, one carried by each unit, and a part relatively fixed with respect to the support, adapted to close electric circuits when the movable members have reached their predetermined limit of movement.

CLIFFORD T. RAULE.